United States Patent [19]
Odagiri et al.

[11] 3,977,928
[45] Aug. 31, 1976

[54] PROCESS AND APPARATUS FOR PRODUCING A SOFT FIBROUS SHEET

[75] Inventors: Saburo Odagiri, Yokohama; Jiro Hirano, Omiya, both of Japan

[73] Assignee: Kabushiki Kaisha Tomoku, Otaru, Japan

[22] Filed: Aug. 15, 1974

[21] Appl. No.: 497,632

[30] Foreign Application Priority Data

Aug. 18, 1973   Japan.............................. 48-92094

[52] U.S. Cl................................ 156/62.2; 156/220; 156/313; 156/549; 156/553; 156/582; 264/119; 428/172
[51] Int. Cl.².......................................... B31F 1/00
[58] Field of Search ........... 156/220, 470, 209, 471, 156/62.2, 549, 192, 553, 276, 582, 313, 285, 219, 324, 199; 161/DIG. 3, 82, 127, 84, 79; 264/119; 19/161 R, 161 P; 428/172, 156, 318, 322

[56] References Cited
UNITED STATES PATENTS

| | | | |
|---|---|---|---|
| 1,456,083 | 5/1923 | Weiss.................................. | 156/276 |
| 2,331,054 | 10/1943 | Shively................................ | 156/209 |
| 2,464,301 | 3/1949 | Francis ........................... | 161/DIG. 3 |
| 2,652,878 | 9/1953 | Gerard................................ | 156/209 |
| 3,259,535 | 7/1966 | Graff................................... | 156/324 |

*Primary Examiner*—Douglas J. Drummond
*Assistant Examiner*—J. J. Gallagher
*Attorney, Agent, or Firm*—Haseltine, Lake & Waters

[57] ABSTRACT

An arrangement for manufacturing a fibrous sheet in which fibers are crushed and dispersed to form a layer of substantially uniform thickness and width. The layer of crushed fibers is conveyed as a continuous belt-shaped sheet layer, and adhesive is sprayed onto the crushed fibers. The sheet layer is then heated and compressed after being impregnated with the adhesive.

2 Claims, 13 Drawing Figures

Fig.3 - a
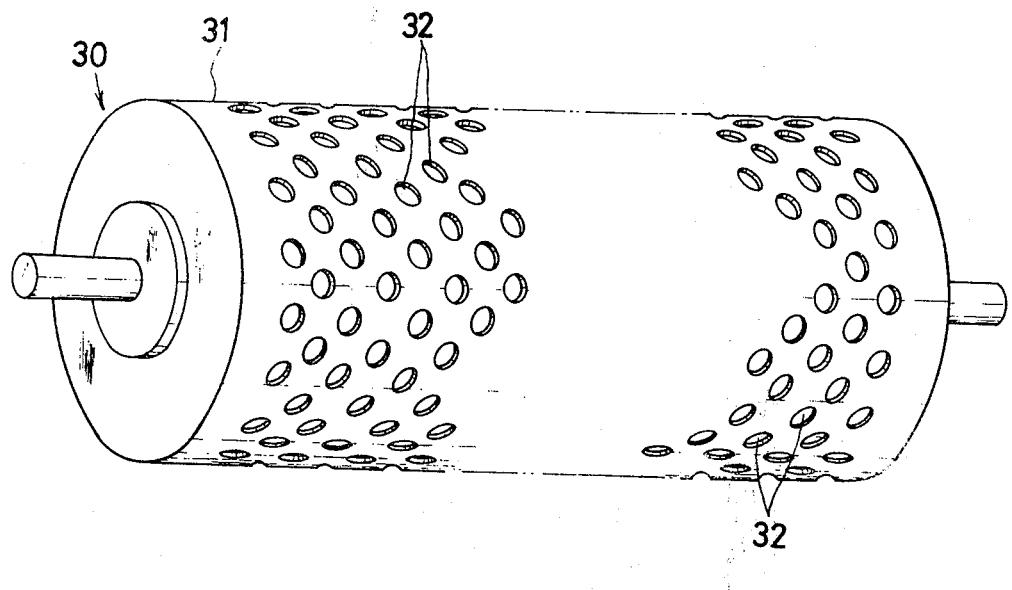
Fig.3 - b
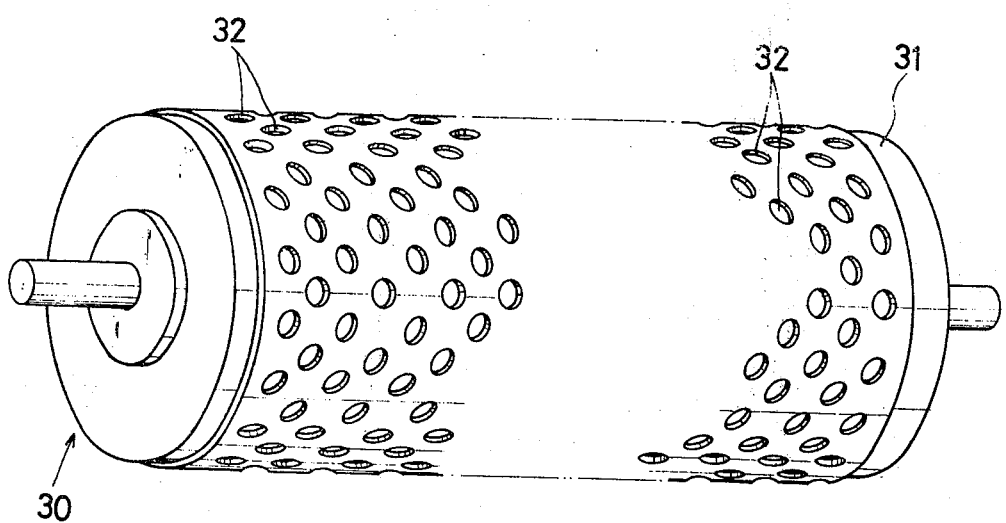

PROCESS AND APPARATUS FOR PRODUCING A SOFT FIBROUS SHEET

BACKGROUND OF THE INVENTION

The present invention relates to a soft fibrous sheet suitably used as a shock absorbing member for packing, building or the like. A fibrous material of an inorganic fiber or of a vegetable fiber such as wood pulp, waste paper or the like is used as a raw material.

It has been common, heretofore, to manufacture this kind of soft fibrous pulp sheet by a wet type process using water as a medium with the fibrous raw material soaked in water. This process, however, is defective in that, for maintaining the shock absorbing property of the resulting fibrous pulp sheet, large-scale apparatus is needed for sucking up the water and for forming and drying, so that the process has high cost of equipment. In a manufacturing process of a soft fibrous sheet by a conventional dry type process, it is usual that fibrous and an adhesive agent are first mixed, and the mixture is then formed into an uniform thickness sheet layer to be heated and compressed. This is defective, however, in that the fibers are liable to become entangled in a lump by the action of the adhesive agent. A uniform and good quality sheet in which the fibers are loosened, cannot be thereby obtained.

Accordingly, in view of those defects in the conventional process, the principal object of the present invention is to provide a soft fibrous sheet manufacturing process in which a good quality of pulp sheet with fibers uniformly dispersed is obtained. It is also an object of the present invention that after a crushed fibers sheet layer of large width and uniform thickness is formed by dispersion of finely crushed fibers, the crushed fibers sheet layer is impregnated with an adhesive agent and is then heated and compressed.

Another object of this invention is to provide a manufacturing process of a soft fibrous sheet having an excellent shock absorbing property. The crushed fibers sheet layer impregnated with the adhesive agent, is heated and compressed by a heating and compressing member having its concave-convex surface so that a large number of shock absorbing projections are formed, by embossing, on its surface.

Another object of this invention is to provide a manufacturing process of a soft fibrous sheet which is very smooth, and in which the crushed fibers sheet layer impregnated with the adhesive agent is laminated at least at its one side surface with a thin sheet member such as a sheet of thin paper, thin cloth or the like. The sheet layer is heated and compressed through the thin sheet member.

Another object of this invention is to provide a soft fibrous sheet formed of very homogeneous crushed fibers. The soft fibrous sheet is to be especially excellent in shock absorbing property, and have improved mechanical strength.

Another object of this invention is to provide manufacturing apparatus for a fibrous sheet formed of crushed fibers uniformly dispersed as described above. The apparatus comprises crushing means for crushing fibers, loosening means for dispersing the crushed fibers, conveying means for conveying the crushed fibers as a continuous and uniform thickness belt form of sheet layer, adhesive agent spraying means for applying uniformly an adhesive agent to the crushed fibers sheet layer, and heating and compressing means for heating and compressing the crushed fibers sheet layer impregnated with the adhesive agent.

Another object of this invention to provide manufacturing apparatus for a soft fibrous sheet especially excellent in shock absorbing property, and having heating and compressing means in the form of a heating and compressing surface member having on its periphery a large number of recesses and a compressing member for pressing thereagainst the crushed fibers sheet layer impregnated with the adhesive agent.

Another object of this invention is to provide manufacturing apparatus for a soft fibrous sheet high in strength and flexibility. The apparatus includes thin sheet supplying means for supplying a thin sheet member such as a sheet of thin paper, thin cloth or the like onto the crushed fibers sheet layer impregnated with the adhesive agent.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 3a and 3b are perspective views of forming drums;

DESCRIPTION OF THE PREFERRED EMBODIMENTS

Figure 1:
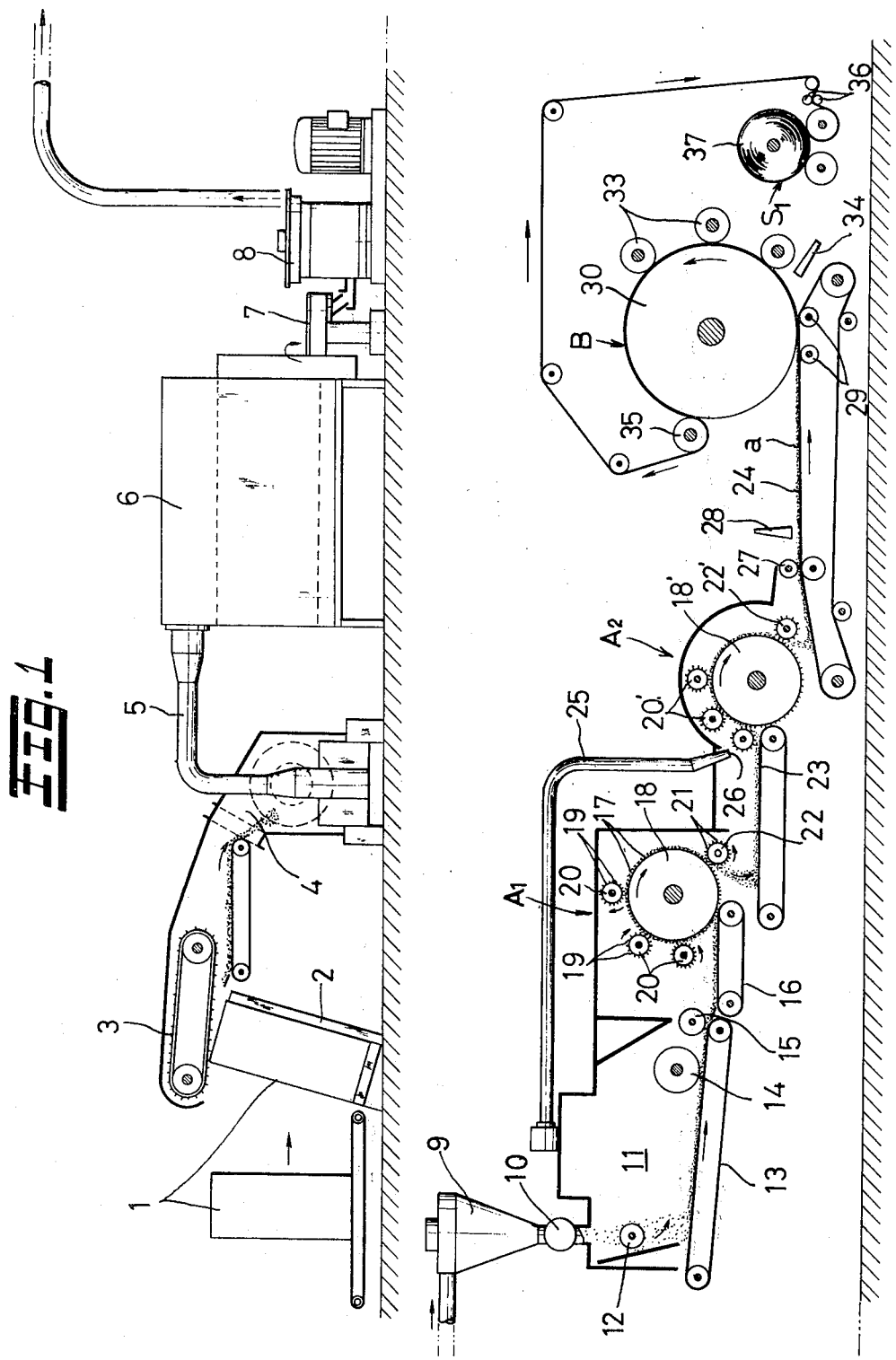
FIG. 1 is an elevational view showing apparatus for one example of the fibrous sheet manufacturing process in accordance with the present invention.

Referring to the drawing, FIG. 1 shows a process and apparatus for manufacturing a soft fibrous sheet in accordance with the present invention. A fibrous raw material 1 such as wood pulp, waste paper or the like, is moved upwards by a lifting table 2 and is scratched away consecutively by a large number of moving teeth of a scratch conveyor 3 installed above the same. The fibrous materials carried, thereby, are supplied through a belt conveyor to a rough crushing machine 4 as, for example, a crusher, a shredder or the like. The fibers roughly crushed thereby, are sent under pressure by a blower 5 to a silo 6 and are stored therein. The roughly crushed fibers contained in the silo 6 are entered, after being measured by a measuring machine 7, into a crushing machine 8 such as a pulverizer, refiner or the like for being formed into finely crushed fibers.

The finely crushed fibers are then transferred together with air to a cyclone 9 and enter a hopper 11, while being separated from the air, through a rotary bulb 10 provided at the lower end of the cyclone 9. The hopper 11 is provided therein with a scattering roll 12 located just below the hopper 11, and the fibers passing through the rotary bulb 10 may be scattered, thereby, so that they may drop with a predetermined large width on a conveyor 13. Thus, the crushed fibers are collected on the conveyor 13 with a proper thickness. The hopper 11 is provided with bridge-preventing apparatus 14 for preventing the collected crushed fibers from becoming lumped by increasing the amount accumulated.

The crushed fibers are fed forward by the belt conveyor 13 and a feed roll 15 provided at one end thereof, and are placed on a next belt conveyor 16. The crushed fibers are conveyed forward by the belt conveyor 16 and reach a first fiber loosening machine A1 provided at the forward end of the conveyor 16, whereby fiber loosening and dispersing actions are repeated. The first fiber loosening machine A1 comprises a main drum 18 having, on its periphery, a needle cloth 17, three fancy rolls 20,20,20 having on their peripheries needle clothes 19,19,19 and a clearing roll 22 having on its periphery a needle cloth 21. By rotating the main drum 18 and the fancy rolls 20,20,20 in directions of the arrows, loosening and dispersing of the crushed fibers are effected by the mutual actions thereof, and finally the crushed fibers adhering to the main drum 18 are brushed off while being dispersed by the needles of the needle cloth 21 on the clearing roll 22. The crushed fibers can be obtained, thereby, on a next belt conveyor 23 in such a dispersed accumulated layer condition, that the fibers are well loosened without and lump. Then, the crushed fibers sheet layer thus dispersed and accumulated on the conveyor 23, is moved forward to reach a second fiber loosening machine A2, whereby the same is subjected to loosening and dispersing actions in almost the same manner as by the foregoing first fiber loosening machine A1. The crushed fibers are placed and accumulated, thereby on a next conveyor 24 is such a condition that the same are well loosened. During this period, the conveyor 24 is moved in one direction at a predetermined speed, whereby a continuous, belt-shaped and uniform thickness of substantially uniform and homogeneous crushed fibers accumulated layer $a$ is obtained on the conveyor 24. The second loosening machine A2 is entirely identical in construction and operation to the first loosening machine A1 and comprises a main drum 18', fancy rolls 20', 20', 20' and a clearing roll 22'. In order that the crushed fibers may be accumulated in a predetermined amount on the conveyor 24, it is so designed that the amount of the fibers supplied by the conveyor 23 is made in excess to that of the fibers to be accumulated on the conveyor 24. The excess amount of fibers is supplied to the fancy roll 20' portion, while the excess fibers are sucked by a suction apparatus 25 provided above the same. Accordingly, it is achieved that a predetermined amount thereof adheres to the loosening machine A2.

Figure 2:
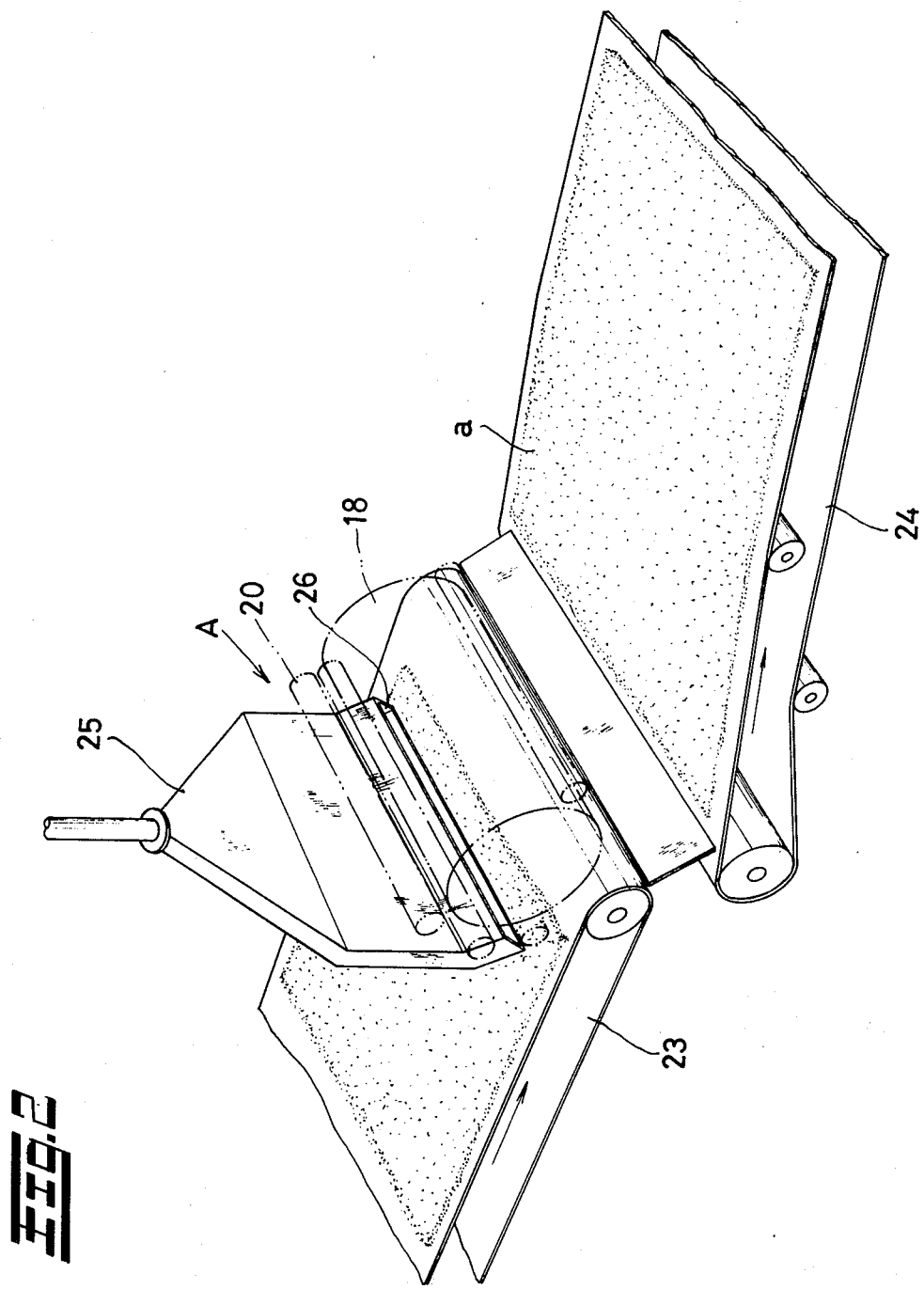
FIG. 2 is a perspective view of suction apparatus in the process of FIG. 1.

For example, the amount per unit area of the fibers belt sent by the conveyor 23, is made in excess of about 5 to 10 percent of the amount per unit area of the fibers belt formed on the conveyor 24. As shown in FIG. 2, a suction opening 26 of the suction apparatus 25 is provided at a predetermined height position above a position where the fibers belt on the conveyor 23 reaches the loosening machine A2. As a result, it opens across the fibers belt with the same or a larger width, whereby the excess fibers reaching the machine A2, are sucked through the suction opening 26 uniformly across the entire belt width. Consequently, a predetermined amount of fibers can adhere for treatment to the machine A2 and a predetermined amount thereof can be supplied to the next conveyor 24. Thus, the uniform, predetermined thickness beltshaped crushed fibers sheet layer $a$ is continuously formed on the conveyor 24 moving at a predetermined speed. This sheet layer $a$ is, then, lightly pressed, for example, to a thickness of 5 mms, by a preliminary compressing roll 27, and thereafter an adhesive agent is sprayed to the surface of the layer $a$ by a predetermined amount, uniformly over the whole surface thereof, by an adhesive agent supplying apparatus 28. The sheet layer $a$ impregnated with the adhesive agent is then pressed to transfer to a forming drum 30 by transfer rolls 29,29. The forming drum 30 is heated by steam supplied to the interior thereof, so that the seat layer $a$ pressed thereon, is dried and fixed thereby. The forming drum 30 is provided on its periphery with a coating film of an adhesion preventing agent such as silicon resin, paraffin or the like. The pressing periphery surface of the forming drum 30 may be either a flat surface or a concave-convex surface. The forming drum having a concave-convex surface may be formed whereby, as shown in FIG. 3a, a large number of concaved portions 32 are formed directly on the flat periphery surface 31 thereof. Alternatively, as shown in FIG. 3b, a punched metal board having a large number of holes made therein is secured, by welding or the like, to the flat periphery surface 31 thereof. Thus, if the concave-convex surface having the concaved portions 32 is formed on the drum periphery by the holes of the punched metal board, it becomes possible that various kinds of punched metal boards having any desired shapes of holes, be prefabricated and selectively used. As a result, forming drums which are different in shape of concaved portions 32, can be economically obtained. Additionally, if punched metal boards of different thickness are prefabricated, an advantage can be provided in that the depth of the concaved portion 21 may be varied. The thickness of the punched metal board on the forming drum 30, as illustrated, is a thin board which is, for example, 1.2 mms in thickness.

Figure 4:
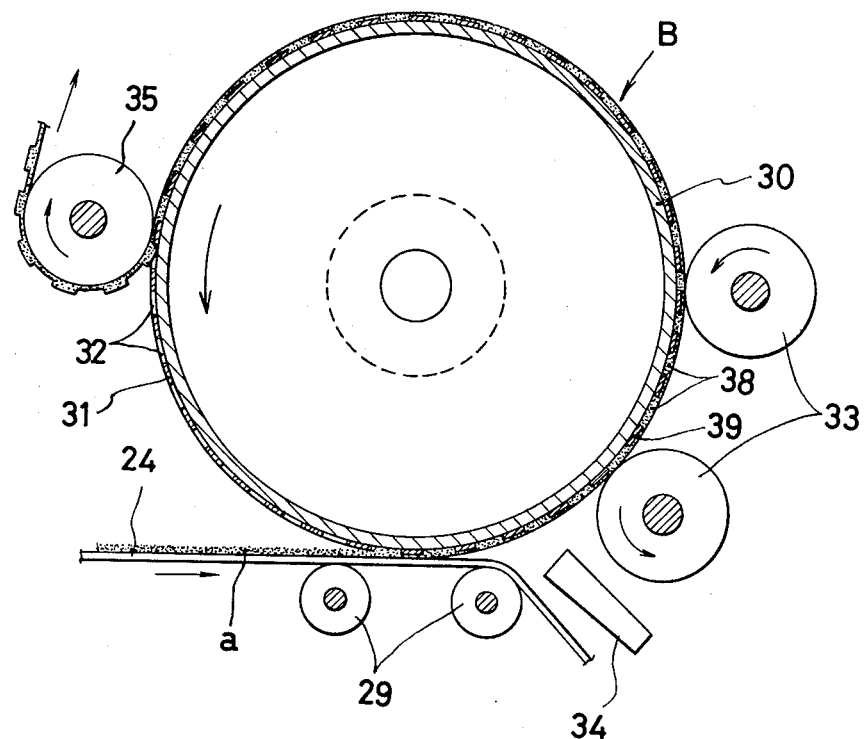
FIG. 4 is an enlarged sectional view of a portion of the apparatus of FIG. 1.

Thus, the sheet layer $a$ impregnated with the adhesive agent and having the thickness of 5 mms is supplied to a heating and compressing apparatus B comprising the heating and forming drum 30, and a pressing roll 33. However, when the same is pressed and transferred to the forming drum 30 by the preceding transfer rolls 29,29, as shown in FIG. 4, the sheet layer $a$ is fully entered in the concaved portions 32 of 1.2 mms depth of the forming drum 30. It is then sent in one direction, under this condition, by the rotation of the forming drum 30. Additionally, the sheet layer $a$ is sprayed and impregnated over the whole surface with an adhesive agent from the opposite side surface by an adhesive agent applying apparatus 34. It is then compressed at its forward side by pressing rolls 33,33,33 such as rubber rolls with proper elastic properties. During this period, the adhesive agent is dried by heat, and thus an embossed surface fibrous sheet of a predetermined shape is formed. It is preferable that the pressing rolls 33,33,33 are provided on their periphery surfaces with coating films of an adhesion preventing agent. The sheet thus obtained is wound about a winder roll 37, through a guide roll 35, and a slitter 36 to become a rolled product.

Figure 5:
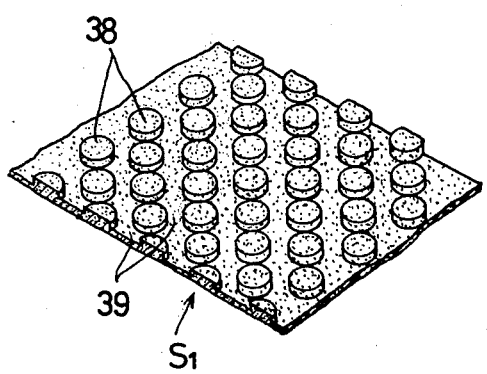
FIG. 5 is a perspective view of a portion of the resultant fibrous sheet.
Figure 6:
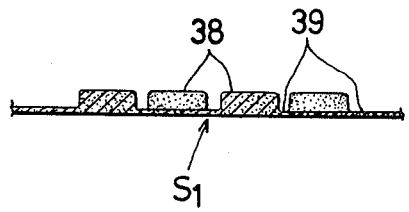
FIG. 6 is an enlarged sectional view of a portion of FIG. 5.

The fibrous sheet S1 thus obtained is a soft fibrous sheet of good quality, as shown in FIGS. 5 and 6. The crushed fibers have no fiber lump, and are uniformly dispersed, loosened and fixed. The sheet comprises a large number of projections 38 embossed corresponding in shape to the concaved portions 32 of the forming drum 30 and a compressed flat portion 39 between those projections 38. The projections 38 are small in fiber density and rich in cushion property, in comparison with the compressed flat portion 39, so that the whole is an extremely excellent product as a shock absorbing member. Thus, each projection 38 is about 2 mms in thickness and the flat portion 39 is about 0.5 mms in thickness. The projection 28, which is formed of crushed fibers, can be obtained with any desired thickness by the selection of the thickness before compression, the depth of the concaved portion 32, and whether or not it is brought into contact under pressure with the bottom of the concaved portion 32. The resultant fibrous sheet is thereby larger in concave-convex property, softness and shock absorbing effect than a sheet of paper which is simply embossed.

In the foregoing apparatus, the second adhesive agent applying apparatus 34 can be omitted if the first adhesive agent applying apparatus 28 is so designed, that the layer $a$ is uniformly and fully impregnated with the adhesive agent supplied thereby.

Figure 7:
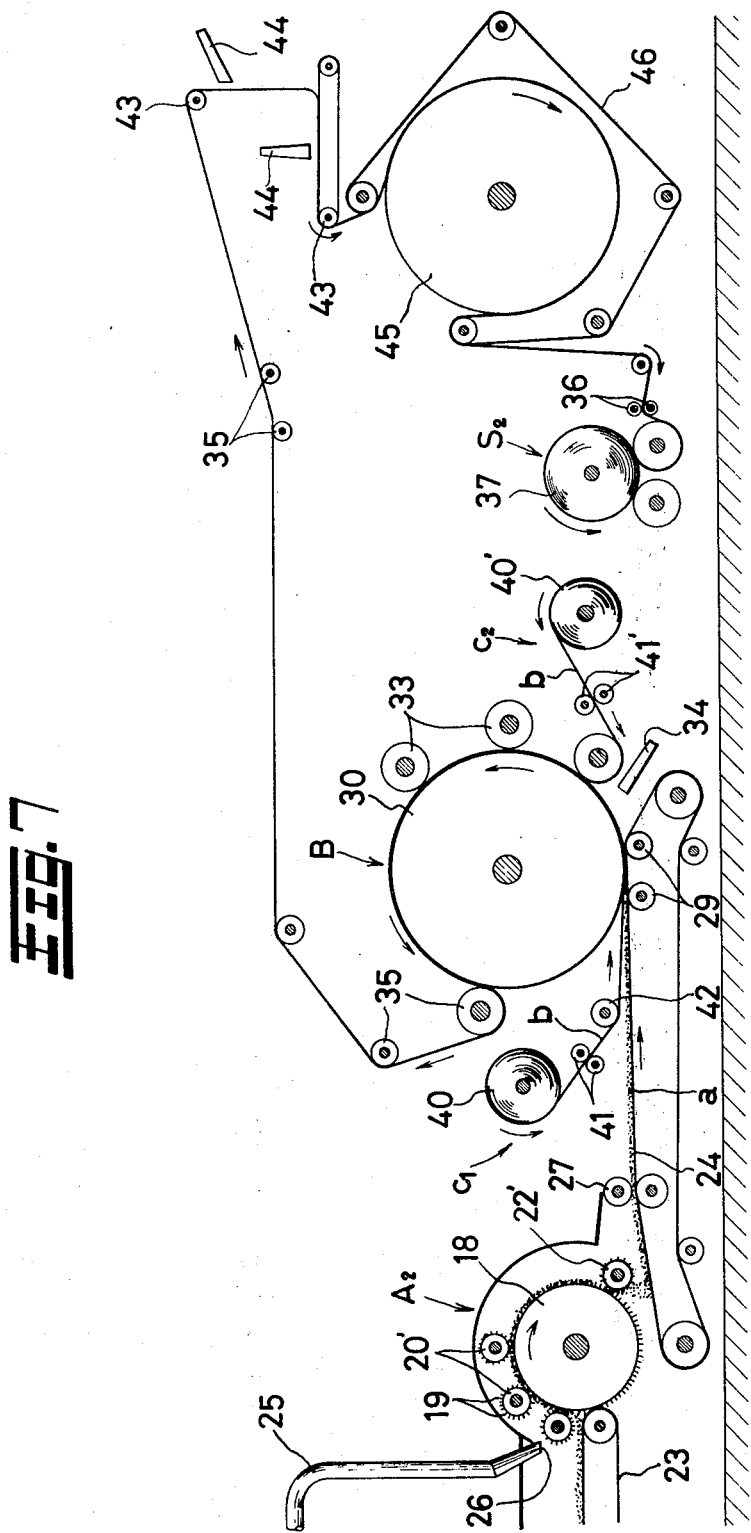
FIG. 7 is a diagram showing apparatus of another embodiment of the manufacturing process of the present invention.
Figure 8:
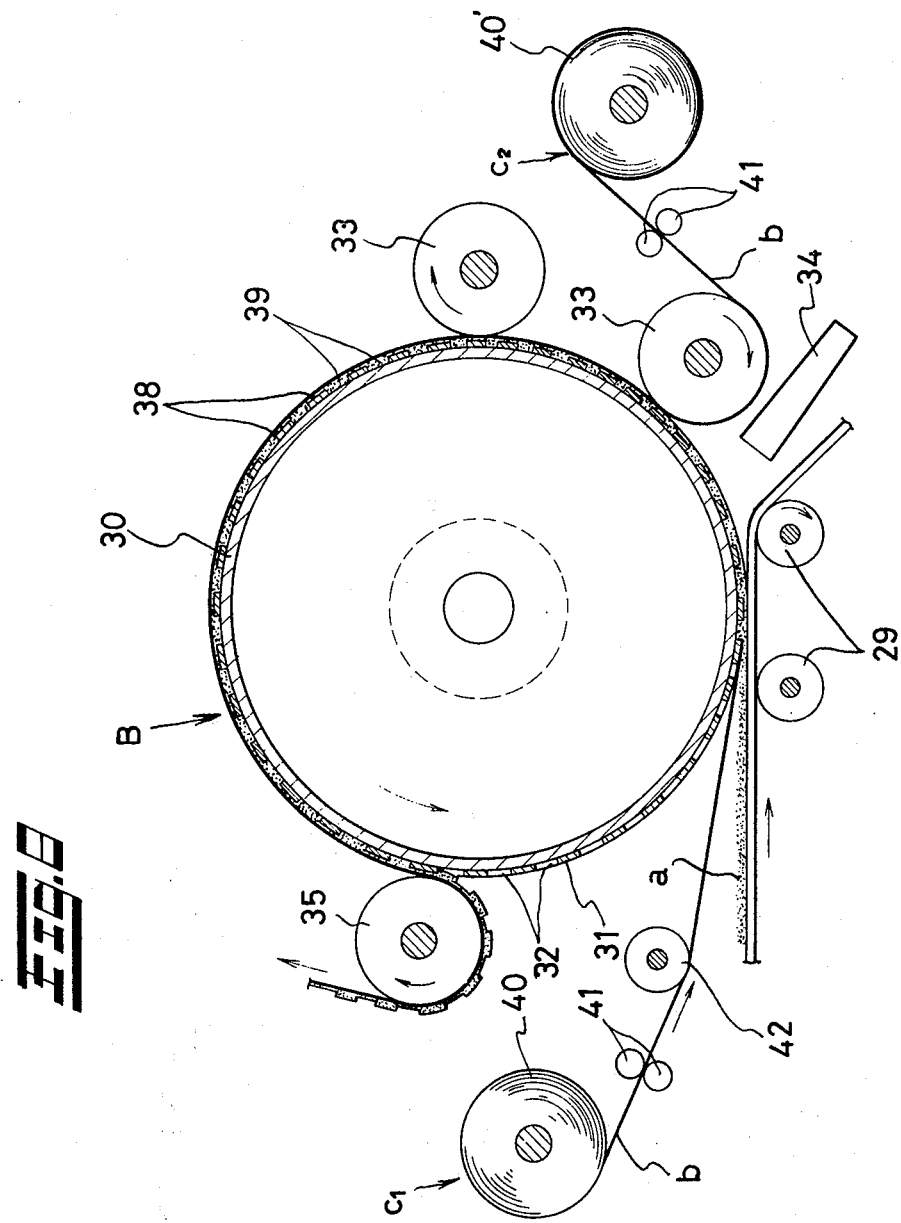
FIG. 8 is an enlarged sectional view of a portion of the apparatus of FIG. 7.

FIG. 7 shows a modified example of this invention. In this fibrous sheet manufacturing example, the crushed fibers sheet layer $a$, in the foregoing example, is laminated at its both surfaces with thin sheet members such as thin paper or thin cloth. In particular, the manufacturing apparatus, in the foregoing example, is provided with a thin sheet member supplying apparatus which serves to supply a thin sheet member such as of thin paper or thin cloth or the like to the sheet layer $a$ surface. Thus, a first thin sheet member supplying apparatus C1 is provided between the fiber loosening machine A2 and the heating and compressing apparatus B comprising the heating and forming drum 30 and the compressing roll 33. The forming drum 30 and the compressing roll 33 in this case are not provided with films of adhesion preventing agents. The first thin sheet member supplying apparatus C1 comprises a thin paper supply roll 40 having a sheet of thin paper such as strong tissue paper, wounded therearound, a pair of feed rolls 41,41 and a guide roll 42, so that the thin paper $b$ is supplied from the supply roll 40 through the guide roll 42 by the feed rolls 41,41 onto the surface of the adhesive agent impregnated crushed fibers sheet layer $a$. The latter is on the conveyor 24 and is formed in almost the same manner as in the foregoing example. Thus, as shown clearly in FIG. 8, when the sheet layer $a$ is pressed and transferred to the forming drum 30 by the transfer roll 29, the same is brought into such a condition that the thin paper $b$ is interposed between the forming drum 30 and the sheet layer $a$. The surface of the sheet layer $a$, impregnated with the adhesive, agent is, thereby prevented from being directly in contact with the forming drum 30 surface. The crushed fibers, will therefore not adhere to the forming drum 30. Then, by the subsequent compression rolls 33,33,33, the thin paper $b$ is made to adhere under pressure through the impregnated adhesive agent, and the fibrous sheet has then the thin paper adhering thereto.

A second thin sheet member supplying apparatus C2 is, furthermore provided so the sheet layer $a$ is laminated at its rear surface with a thin paper member before the same is compressed by the pressing roll 33. The apparatus C2 comprises a thin paper supply roll 40' having a thin paper $b$ wounded therearound and feed rolls 41', 41'.

The lamination of the thin paper $b$ is usually effected through the adhesive agent supplied by the second applying apparatus 34. It can, however, also be effected by omitting the second applying apparatus 34, and applying the adhesive agent with the first applying apparatus in a sufficient amount so that the agent reaches the rear surface of the sheet layer $a$, i.e., reaches the compression roll 33 side. Thus, the thin paper $b$ placed on the rear surface of the sheet layer $a$ adheres to the layer surface through the adhesive agent by the pressing rolls 33,33.

Figure 9:
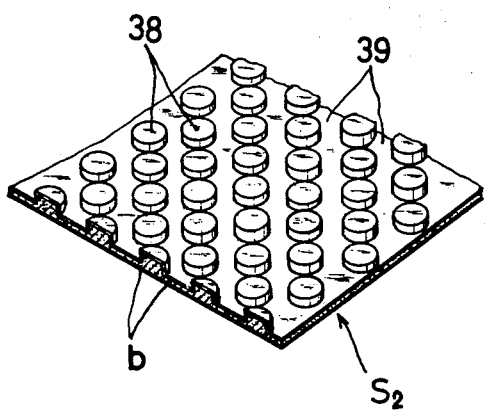
FIG. 9 is a perspective view of a portion of the fabricated fibrous sheet.
Figure 10:
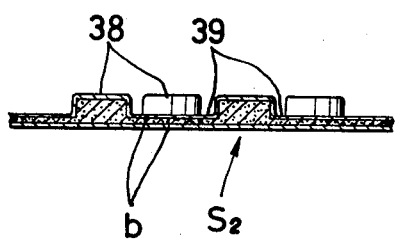
FIG. 10 is an enlarged sectional view of a portion of FIG. 9.

Thus, by the heating and compressing action of the forming drum 30 and the compressing rolls 33,33,33, the sheet layer $a$ is dried and fixed and at the same time the thin papers $b$ and $b$ completely adhere to the sheet layer. Accordingly, a soft fibrous sheet product S2 is obtained so that the surfaces thereof are covered by the thin papers and a large number of shock absorbing projections 38 are formed as shown in FIGS. 9 and 10. This fibrous sheet becomes strong against internal tearing, folding or the like due to the affixed thin papers $b$ and $b$. Additionally, it becomes a product having a display effect if the papers $b$ and $b$ are previously printed with any desired characters or designs.

Figure 11:
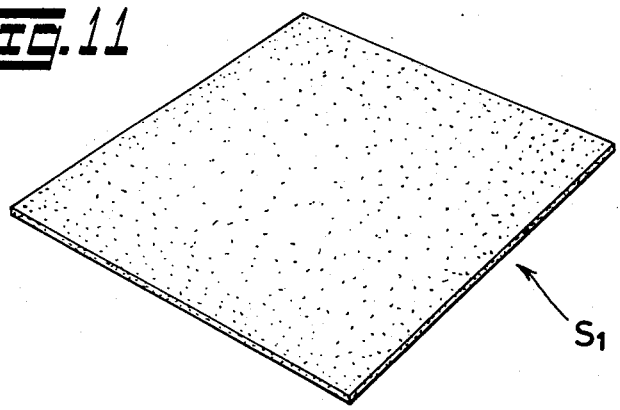
FIGS. 11 and 12 are perspective views of portions of modified embodiments of the fabricated product.
Figure 12:
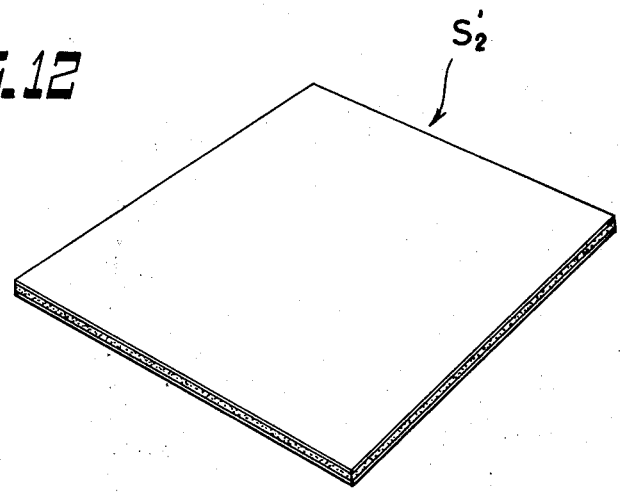

The fibrous sheet thus obtained is not always required to be immediately wound around the winder roll 37. When desired, the same is passed through a guide roll 43, to an applying apparatus 44,44 for applying an adhesive agent, a wax, a water repelling agent or the like. In this manner, the sheet may be subjected to an applying treatment from its one side surface or its both surfaces, and then dried by being pressed on a drying drum 45 by a pressing belt 46. The sheet is wound around a winder roll 37. If the sheet layer is manufactured in substantially the same manner as above by using the forming drum having a flat periphery (not shown), such a flat sheet S1', S2' as shown in FIGS. 10 and 11 can be obtained.

Thus, according to the present invention, after crushed fibers obtained by finely crushing a raw material such as wood pulp, waste paper or the like are dispersed and collected in uniform thickness whereby a sheet layer is formed, the sheet layer is impregnated with an adhesive agent and is then heated and compressed, so that a soft fibrous sheet of good quality is obtained in which the crushed fibers are uniformly dispersed.

According to the present invention, furthermore, if the heating and compressing is effected by a heating and compressing member having a concave-convex surface, a fibrous sheet of good shock, absorbing property can be obtained with soft cushion projections of substantially small fiber density. In this case, the crushed fibers layer is pressed by the heating and compressing member, so that the same is well compressed and at the same time penetrates the concaved portions. The projections corresponding in shape to the concaved portions can be obtained thereby. Furthermore, since the heating is effected at the same time, the shape of the projections can be well established.

According to the present invention, moreover, a thin sheet member, preferably a sheet of thin paper or gauze is placed on the adhesive agent impregnated crushed fibers sheet layer, and these are heated and compressed. In this manner, the crushed fibers are prevented from adhering to the compressing surface and the heating and compressing treatment can be carried out smoothly. The compressing member surface is coated with an adhesion preventing agent or the adhesive agent is mixed with a mold releasing agent or the like, and a fibrous sheet excellent in mechanical strength can be obtained. If desired, an interesting fibrous sheet with improved ornament property can also be obtained.

Without further analysis, the foregoing will so fully reveal the gist of the present invention that others can, by applying current knowledge, readily adapted for various applications without omitting features that, from the standpoint of the prior art, fairly constitute essential characteristics of the generic or specific aspects of this invention, and therefore, such adaptations should and are intended to be comprehended within the meaning and range of equivalents of the following claims.

We claim:

1. A process for manufacturing a soft fibrous sheet comprising the steps of: dispersing finely crushed fibers to form a sheet layer of crushed fibers, said sheet layer having substantially uniform thickness and large width; impregnating said sheet layer with an adhesive agent; thereafter heating and compressing said sheet layer; embossing shock-absorbing projections on the surface of said sheet layer; laminating at least one side surface of said sheet layer with a substantially thin sheet member, said heating and compressing step occurring through said thin sheet member; and forming shock-absorbing projections on the surface of said sheet layer during said heating and compressing, said thin sheet member comprising paper, said laminating, heating, compressing and embossing steps being carried out substantially simultaneously.

2. Apparatus for manufacturing a soft fibrous sheet comprising, in combination, crushing means for crushing fibers; means for dispersing the crushed fibers, conveying means for conveying the crushed fibers as a continuous and uniform thickness belt-shaped sheet layer; adhesive spraying means for applying an adhesive agent uniformly to the crushed fibers sheet layer; thin sheet supplying means for supplying a substantially thin sheet member comprising paper to at least one surface of said crushed fibers sheet layer impregnated with adhesive agent; heating and compressing means comprising a heating and compressing surface member having on its surface concave recesses, for heating, compressing and embossing said impregnated crushed fibers sheet layer in contact with said thin sheet member; and a compressing member suitably arranged for pressing said impregnated crushed fibers sheet layer and said thin sheet member substantially simultaneously against said surface with said recesses.

* * * * *